2 Sheets—Sheet 1.

C. W. RASMUSEN.

Assignor to THE UNITED STATES CABLE RAILWAY COMPANY.

WIRE ROPE OR CABLE RAILROAD.

No. 10,602. Reissued May 26, 1885.

Witnesses:
Frank S. Blanchard.
Wm. C. Dumbuldt Jr.

Inventor:
Charles W. Rasmusen
By Peirce & Fisher
Attorneys.

N. PETERS, Photo-Lithographer, Washington, D. C.

2 Sheets—Sheet 2.

C. W. RASMUSEN.

Assignor to THE UNITED STATES CABLE RAILWAY COMPANY.

WIRE ROPE OR CABLE RAILROAD.

No. 10,602. Reissued May 26, 1885.

Witnesses:

Frank S. Blanchard.

Neil C. Ommundsen.

Inventor:

Charles W. Rasmusen

By Peirce & Fisher

Attorneys

N. PETERS, Photo-Lithographer, Washington, D. C.

UNITED STATES PATENT OFFICE.

CHARLES W. RASMUSEN, OF CHICAGO, ILLINOIS, ASSIGNOR TO THE UNITED STATES CABLE RAILWAY COMPANY, OF SAME PLACE.

WIRE ROPE OR CABLE RAILROAD.

SPECIFICATION forming part of Reissued Letters Patent No. 10,602, dated May 26, 1885.

Original No. 248,665, dated October 25, 1881. Application for reissue filed March 17, 1883.

*To all whom it may concern:*

Be it known that I, CHARLES W. RASMUSEN, a citizen of the United States, residing at Chicago, in the county of Cook and State of Illinois, have invented a new and useful Improvement in Wire Rope or Cable Traction-Railroads; and I do hereby declare that the following is a full, clear, and exact description of the same.

My invention relates to improvements in the class of street-railways in which the cars are propelled by means of endless traveling wire ropes or cables arranged in a tube or tubular center rail (laid between the ordinary track or running rails) and passing around rotating drums located at the respective ends of the road, or at points which are at less distance apart.

My improvements pertain to the combination of tubular center rail, the trucks that carry the traction-cables therein, and the device attached to the car and adapted to lock with the trucks to cause propulsion of the car; also, to the clearer or scraper for removing snow, dirt, or other obstructing material that may fall through the slot in the center rail and thus accumulate therein; also, to mechanism for moving and stopping the cars, as hereinafter described.

Figures 1, 2:
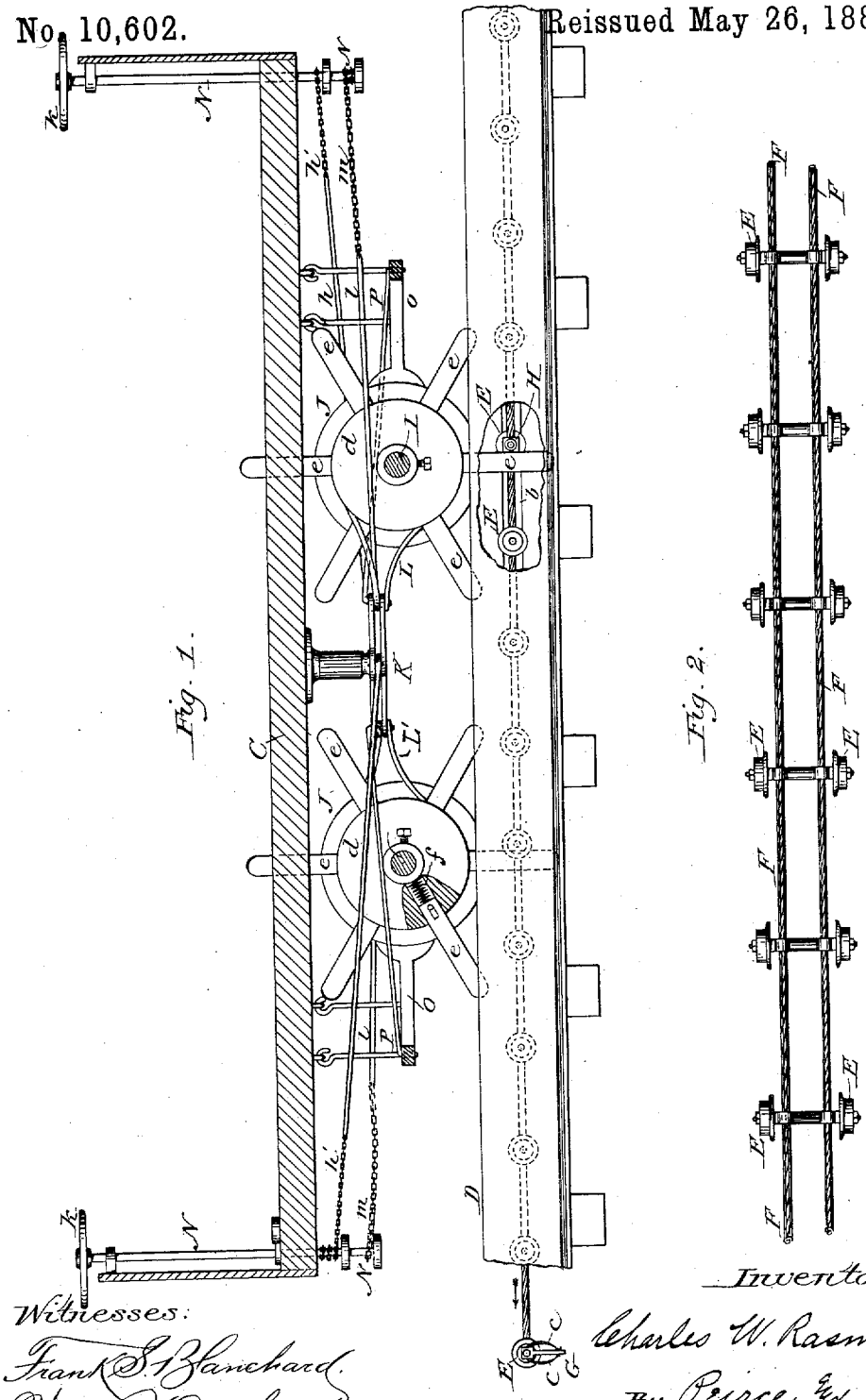
Figures 3, 4, 5:
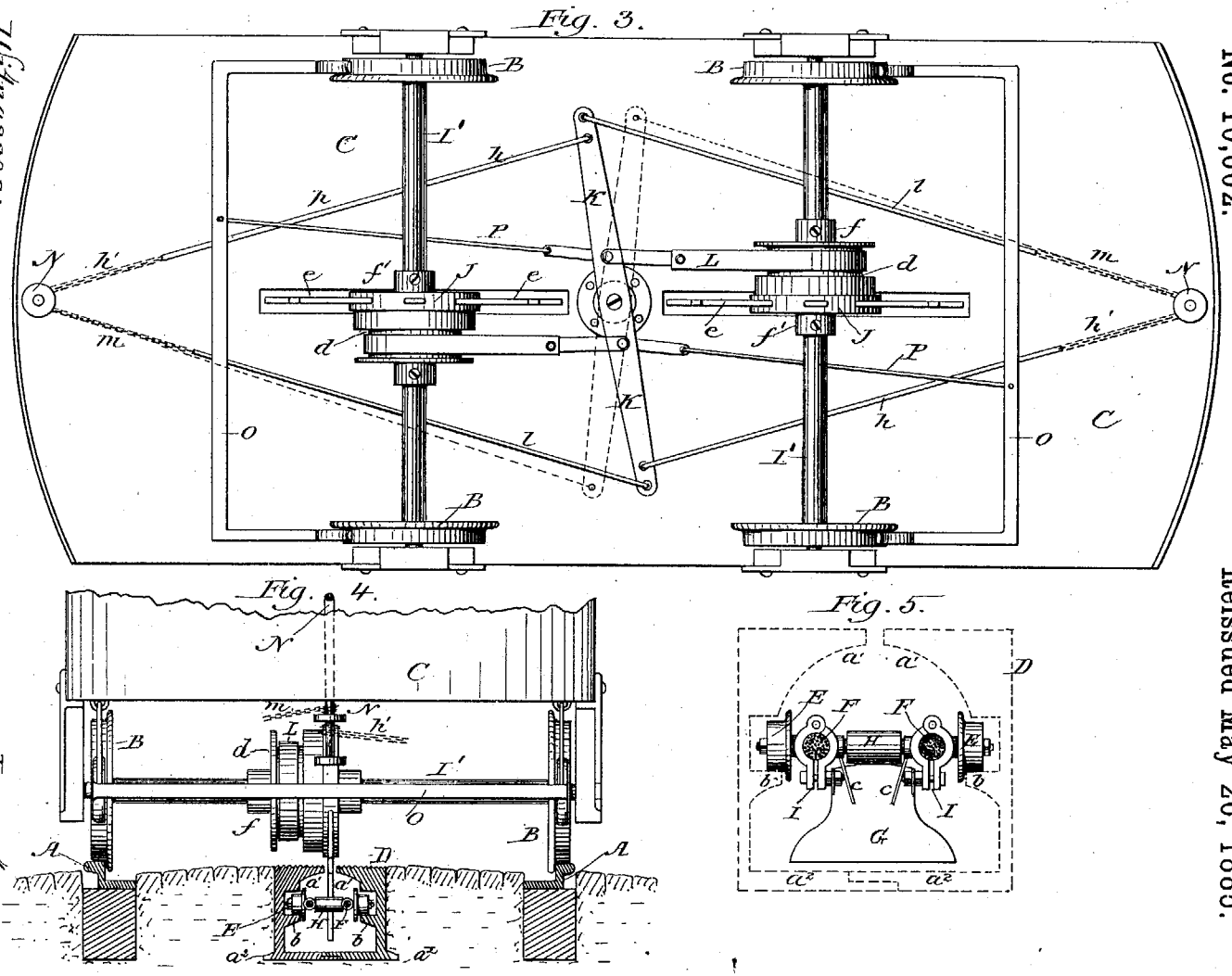

In the accompanying drawings, forming part of this specification, Figure 1 is a sectional view showing the tube or tubular rail in which the cable runs and a car-bottom having my improved mechanism applied thereto for connecting it with said cable. Fig. 2 is a plan view of the double cable and trucks attached thereto. Fig. 3 is a plan view of the car-bottom and attached mechanism inverted. Fig. 4 is an end view of the car and sectional view of the track. Fig. 5 is a cross-section of the double cable enlarged.

The rails A A, on which the transporting-wheels B B of the car C run, are constructed and laid in the usual way. Equidistant between them is placed the tube D, which is preferably laid on the same cross-ties that support the sleepers of the track-rails A A, and whose upper side is on a level with the latter, as shown, Fig. 4. The different sections of the tube D are divided lengthwise, or constructed of two like parts, for sake of economy in manufacture and convenience in handling or laying the rails and repairing the road. Each part or half of such tube D is constructed with continuous horizontal top and bottom flanges, $a'$ $a^2$, and an intermediate rib, $b$, all of which are formed on the inner side of such parts, so that when the latter are placed together in the required relation, as shown in Fig. 4, the base-flanges $a^2$ abut, or preferably lap, and the top flanges, $a'$, being of less width, are separated by a narrow space, which constitutes a slot that is continuous with the tube.

The ribs $b$ serve as track or rail supports for the small wheels E of trucks that carry the endless wire ropes F F, constituting the double traction-cable that propels the cars—that is to say, the endless ropes F are placed side by side and run on drums (not shown) that are placed either at the ends of the road or any other required distance apart, and rotated by a steam-engine or other motor, so that the cable as a whole travels constantly in one direction, (although one half of it necessarily moves in the opposite direction to the other half and through the tube of the neighboring track of the same road.)

The drums will have peripheral grooves or else rows of cavities to receive the wheels E, so that the ropes F will bear on the drums, and the wheels be relieved of strain. The wheels E are journaled on short axles H, having detachable and adjustable clamps I, Fig. 5, through which the wire ropes F F pass, and by which they are firmly secured and held separated nearly the distance of the space between the wheels E. The latter are constructed with a tread and flange like ordinary car-wheels, to prevent them from becoming detached from the ribs on which they run, and for the same reason the diameter of the body of the wheels E is nearly the same as the distance between the ribs $b$ and the under side or base of the top flanges, $a'$, of the tube D, so that the wheels can have no vertical movement, or at most but a very slight one. By this construction and arrangement of the tube and cable-trucks the cable is supported and carried along steadily and with comparatively little friction.

To some of the truck-axles I hinge a pendent metal plate, G, Figs. 1 and 5, which serves as a scraper or clearer for removing from tube D accumulations of snow or other obstructing material that may fall through the slot in the same.

Man-holes will be provided at suitable intervals in the tube D to receive the material collected by the clearer. Springs *c* are applied on each side of the clearer to hold it normally vertical, yet allow it to yield or turn on its hinge in case one of the arms of the propelling-wheels chances to strike it at an oblique angle.

I preferably roughen the upper surface of the tube D to prevent horses' feet slipping thereon. I also propose to have the lapping portions of the base-flanges $a^2$ constructed to interlock, so as to prevent the longitudinal parts from tipping or turning outward. The said parts will be secured together by bolts (not shown) passing through the base.

I will now describe the apparatus which is attached to the under side of the car for connection and disconnection with the cable F F, and also for braking the car.

In the first place, it is to be understood that the transporting-wheels B B are fast on their axles, and otherwise constructed and arranged in the usual way. On each axle I′, at the middle of its length, is loosely mounted a rimless propelling-wheel, J—that is to say, a wheel composed of a hub, *d*, having radiating spokes or arms *e*. The latter are arranged to slide in radial sockets in the hubs of wheel J, and spiral springs *f*, Fig. 1, are placed in such sockets behind the spokes, so that the latter will yield in case they should strike on one of the truck-axles H or other object.

The arms *e* may be curved, to better adapt them to engage the truck-axles H.

The respective wheels J are prevented from movement endwise of the axles I′ by means of clamping-collars *f*′. The spokes or arms *e* are of sufficient length to enable them to project down through the slot in the tube D and engage the axles H of the cable-trucks, as shown in Fig. 1, and they are made as thin as practicable, so that the slot in tube D may be made correspondingly narrow.

It will be noticed that by placing the traction-cable upon the trucks and out of line with the slot in the tube a much deeper space is allowed for the movement of the depending arms *e*, which may thus be made of greater length, and hence fewer in number than would be possible were the cable immediately below the slot of the tube.

It is obvious that if the cable travels in the direction indicated by arrows, Fig. 1, and the wheels J be locked so that rotation is prevented, the car C will be propelled at the same rate as the cable travels, since the spoke or arm *e* that rests against the truck-axle H constitutes for the time being a fixed attachment of the car.

The means for locking the propelling-wheels J are in the nature of friction-brakes whose primary elements are a lever, K, and flexible metal bands L, that work on the friction-hubs *d* of the propelling-wheels. The lever K is pivoted to the car-bottom equidistant between the axles I′ and arranged transversely, as shown. Each friction-band L is attached to said lever at points on opposite sides of its fulcrum, and each end of the lever is connected by rod *h* and chain *h*′ with the respective winding-posts N at the ends of the car. Such winding-posts are provided with the usual hand-wheel, *k*, Fig. 1, and pawl and ratchet for locking them when the car is in motion. By rotating either post N the lever K will be shifted in position—as, for example, from the position shown by dotted lines to that shown by full lines in Fig. 3—and the friction-brakes applied, so as to lock the wheels J rigidly and effect the propulsion of the car; and if it be desired to arrest the car such winding-post N is released and turned the other way, which has the effect of applying the brake to the car-wheels.

It will be noted that the wheels J are locked, as described, so that they cannot rotate, but without preventing rotation of the axles therein, by reason of the great difference in the area of the respective frictional surfaces and the difference in leverage, which is in the ratio of the diameters of the wheel-hubs and axles, respectively; hence a comparatively slight amount of friction on the periphery of the wheel-hubs is sufficient to lock the wheels by overcoming the friction of the axle with the hubs.

I employ the old form of brake-beams, O, except that they are bent at each end to allow space for the operation of the propelling-wheels J, and I connect them with the lever K by rods P, which are attached at the same points as the friction-band L, and from the respective ends of the lever K brake-rods and chains *l* and *m* extend to winding-posts N. The chains *h*′ *m* are, however, wound on the posts N in reverse direction, Fig. 1, so that when a post is rotated in one direction to apply the friction-bands L and lock the wheels J, in order to produce propulsion of the car, the chains *m* will be slackened correspondingly and the brake-beams O let off the running-wheels B, and, vice versa, the reverse rotation of a winding-post N applies the brakes O and simultaneously releases the lock of the propelling-wheels, so that the car is promptly arrested. Thus the mechanisms for starting and stopping the car are combined and operated simultaneously and by the same means or mechanical agent—to wit, the winding-post. An advantage secured by thus having the double connections (rods *l h* and chains *h*′ *m*) extending from the winding-posts to the lever K is that the operation of the brake-beams and of the mechanism for connecting the car with the cable is made positive and subject to the control of the operator in regulating the speed of the car.

I propose to lay a small steam-pipe in the tube D, for the purpose of melting snow or ice therein, if necessary.

Having thus described my invention, what I claim as new, and desire to secure by Letters Patent, is—

1. In a cable-railway car, the combination, with mechanism for attaching the car to a moving cable and brake-beams for arresting the movement of the car, of the winding-posts, and means for connecting the mechanism for attaching the car to the cable with and positively operating it from the winding-post, and means for connecting the brake-beams with and operating them likewise from the winding-post, whereby the stopping and starting of the car may be positively and gradually controlled by the operator, substantially as described.

2. In a cable-railway car, the combination, with mechanism for attaching the car to a moving cable and brake-beams for arresting the movement of the car, of the winding-posts, and double connections extending from each of said winding-posts and operated thereby in reverse manner, whereby the starting and stopping of the car may be gradually and positively controlled by the operator, substantially as described.

3. The combination, with the mechanism for connecting the car with a moving cable and brake-beams for stopping the car, of lever mechanism having double connections extending to each winding-post of the car and attached to said post in reverse manner, substantially as described.

4. The combination, with a car, of projecting arms for connecting the car with a moving cable, a friction-clutch for arresting the movement of said arms, brake-beams, and mechanism for operating conjointly the brake-beams and friction-clutch, substantially as described.

5. The combination, with the traction-cable supported upon trucks, of a cable-tube having rails and having a slot located out of line with the cable and with the rails of the tube, substantially as described.

6. The combination, with a traction-cable supported on trucks, of a cable-car having a series of movable depending arms for connecting the car with the cable, substantially as described.

7. The combination, with a car provided with revolving projecting arms, of the traction-cable supported upon trucks, and a cable-tube having rails and having a slot located out of line with the cable, substantially as described.

8. The combination, with a cable-tube and cable, of a clamp, and truck-wheels located out of alignment with the slot of the cable-tube, and an axle or extension for supporting said truck-wheels located beneath the slot of the tube, substantially as described.

9. The combination, with the cable, of a clamp having flanges, and bolts for securing the clamp to the cable, and having truck-wheels connected to said clamps, substantially as described.

10. The combination, with the spoked wheel and the car, of the two cables F F, arranged side by side, and clamping devices therefor, and the trucks consisting of axles H and wheels E, and the tube D, having the lengthwise ribs and corresponding grooves to receive the wheels, substantially as described.

11. The combination of springs with the hinged clearer and traveling cable-trucks, substantially as described.

12. The combination of a lever with a wheel having radial arms, and mounted loose on the car-axle, the friction-band passing around the hub of the wheel and operated by traction on the lever, a winding-post, a rod and chain attached thereto and to the lever, substantially as described.

13. The combination of the winding-post and lever, and devices connecting them and wound reversely on the former, the friction-bands, the propelling-wheels having friction-hub and radial arms, the brake-beams, and the rods connecting them with the lever, substantially as described, whereby the application of the friction-bands releases the brakes, and vice versa, substantially as set forth.

14. The combination of springs and sliding spokes with the wheel-hubs having radial sockets, substantially as described, and for the purpose specified.

In testimony whereof I have hereunto set my hand this 1st day of March, A. D. 1883.

CHARLES W. RASMUSEN.

Witnesses:
J. O. MORRIS,
GEORGE P. FISHER, Jr.